(12) United States Patent
Brown

(10) Patent No.: US 12,568,102 B2
(45) Date of Patent: Mar. 3, 2026

(54) SYSTEM AND METHOD FOR TIMING-BASED NETWORK ENTITY RESOLUTION

(71) Applicant: Crowdstrike, Inc., Sunnyvale, CA (US)

(72) Inventor: Daniel W. Brown, Ipswich, MA (US)

(73) Assignee: Crowdstrike, Inc., Sunnyvale, CA (US)

( * ) Notice: Subject to any disclaimer, the term of this patent is extended or adjusted under 35 U.S.C. 154(b) by 161 days.

(21) Appl. No.: 18/622,494

(22) Filed: Mar. 29, 2024

(65) Prior Publication Data

US 2025/0310363 A1 Oct. 2, 2025

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC ........................ H04L 63/1425; H04L 63/1416
USPC .......................................................... 726/23
See application file for complete search history.

(56) References Cited

U.S. PATENT DOCUMENTS

| | | | |
|---|---|---|---|
| 9,335,885 B1 | 5/2016 | Brocato | |
| 10,574,683 B1 | 2/2020 | Ghosh et al. | |
| 11,122,067 B2 * | 9/2021 | Yona ....................... | H04L 63/20 |
| 2008/0065672 A1 | 3/2008 | Bamford et al. | |
| 2014/0201838 A1 * | 7/2014 | Varsanyi ............... | G06F 21/552 726/23 |
| 2015/0026766 A1 * | 1/2015 | Holloway ........... | H04L 63/1466 726/1 |

| | | | |
|---|---|---|---|
| 2015/0286704 A1 | 10/2015 | Shyr et al. | |
| 2017/0063888 A1 | 3/2017 | Muddu et al. | |
| 2017/0140072 A1 | 5/2017 | Sidorenko | |
| 2018/0020078 A1 | 1/2018 | Laufenberg et al. | |
| 2019/0387009 A1 | 12/2019 | Kondaveeti | |
| 2024/0078222 A1 | 3/2024 | Brown et al. | |

OTHER PUBLICATIONS

Non-Final Office Action for U.S. Appl. No. 17/902,628, mailed Apr. 11, 2024, 46 pages.
Non-Final Office Action for U.S. Appl. No. 17/902,628, mailed Feb. 27, 2025, 34 pages.
Final Office Action for U.S. Appl. No. 17/902,628, mailed Nov. 1, 2024, 63 pages.

* cited by examiner

*Primary Examiner* — Badrinarayanan
(74) *Attorney, Agent, or Firm* — Elliott, Ostrander & Preston, P.C.

(57) ABSTRACT

A first request message is received from a first device that specifies a destination network address and identifier for a second device, and a first timestamp. A first acceptance message is received from the second device that specifies a destination network address and identifier for the first device, and a second timestamp. A second request message is received from the first device that specifies the destination network address and identifier for the second device, and a third timestamp. A second acceptance message is received from the second device that specifies the destination network address and identifier for the first device, and a fourth timestamp. The first device is determined to be communicating with the second device when the first and second timestamps indicate the first request and acceptance messages, and when the third and the fourth timestamps indicate the second request and acceptance messages, occurred at substantially the same time.

18 Claims, 4 Drawing Sheets

Figure 1:
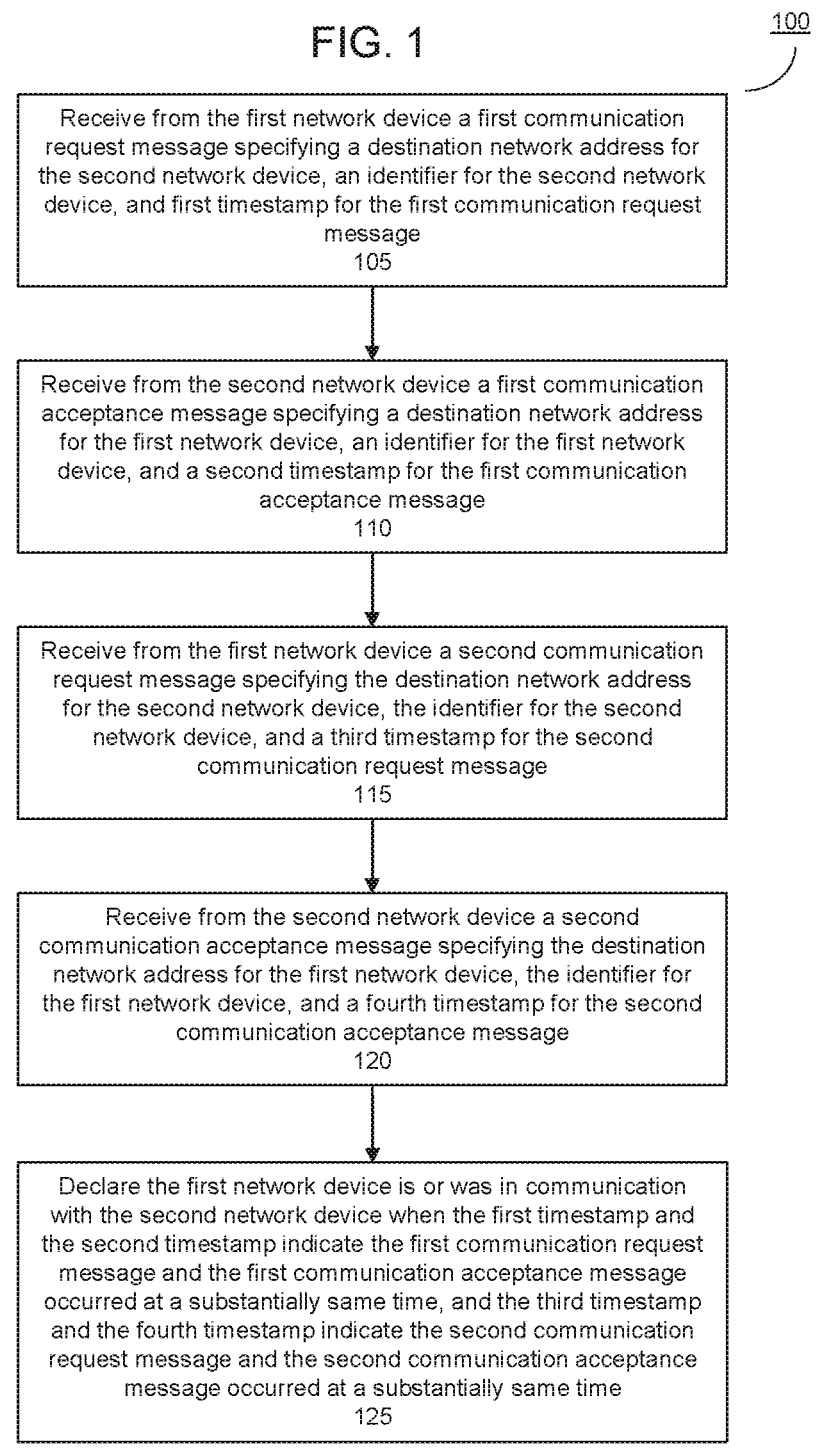

FIG. 1                                          100

Receive from the first network device a first communication request message specifying a destination network address for the second network device, an identifier for the second network device, and first timestamp for the first communication request message
105

Receive from the second network device a first communication acceptance message specifying a destination network address for the first network device, an identifier for the first network device, and a second timestamp for the first communication acceptance message
110

Receive from the first network device a second communication request message specifying the destination network address for the second network device, the identifier for the second network device, and a third timestamp for the second communication request message
115

Receive from the second network device a second communication acceptance message specifying the destination network address for the first network device, the identifier for the first network device, and a fourth timestamp for the second communication acceptance message
120

Declare the first network device is or was in communication with the second network device when the first timestamp and the second timestamp indicate the first communication request message and the first communication acceptance message occurred at a substantially same time, and the third timestamp and the fourth timestamp indicate the second communication request message and the second communication acceptance message occurred at a substantially same time
125

Figure 2:
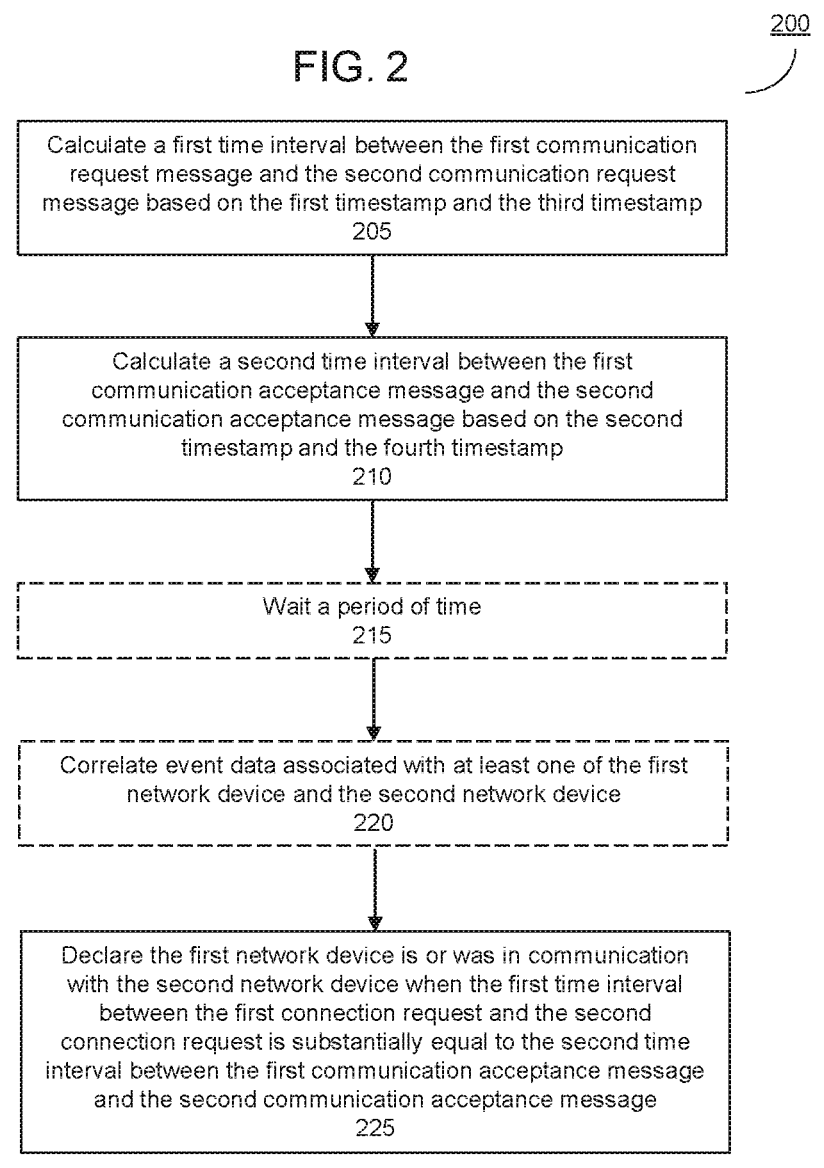

Calculate a first time interval between the first communication
request message and the second communication request
message based on the first timestamp and the third timestamp
205

Calculate a second time interval between the first
communication acceptance message and the second
communication acceptance message based on the second
timestamp and the fourth timestamp
210

Wait a period of time
215

Correlate event data associated with at least one of the first
network device and the second network device
220

Declare the first network device is or was in communication
with the second network device when the first time interval
between the first connection request and the second
connection request is substantially equal to the second time
interval between the first communication acceptance message
and the second communication acceptance message
225

SYSTEM AND METHOD FOR TIMING-BASED NETWORK ENTITY RESOLUTION

CROSS REFERENCE TO RELATED DOCUMENTS

N/A

TECHNICAL FIELD

Embodiments of the invention relate to systems and methods that can identify a communication session between two networked entities without regard to corresponding local and remote addresses respectively assigned to the networked entities.

BACKGROUND

Cybersecurity professionals or information technology (IT) professionals need to be able to understand the network environments they manage and protect, including knowing the computing and networking devices in the network environment, reviewing data or events regarding communications or connections between the devices, and discerning whether such data or events suggests the connections between devices are legitimate or problematic or malicious. For example, for some computing devices, such as a server, in the network environment, it may be important to understand what computing devices generally or typically connect to the server, from where, and how often, to get a sense of whether event information detailing connections with the server suggest normal transactions or communication or anomalous transactions or communications with the server that should be investigated further and/or stopped. To that end, the accuracy and reliability of the event information detailing connections between devices in the network environment is important.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 is a flowchart of a method according to an embodiment of the invention.

FIG. 2 is a flowchart of a method according to embodiments of the invention.

DETAILED DESCRIPTION

Figure 3A:
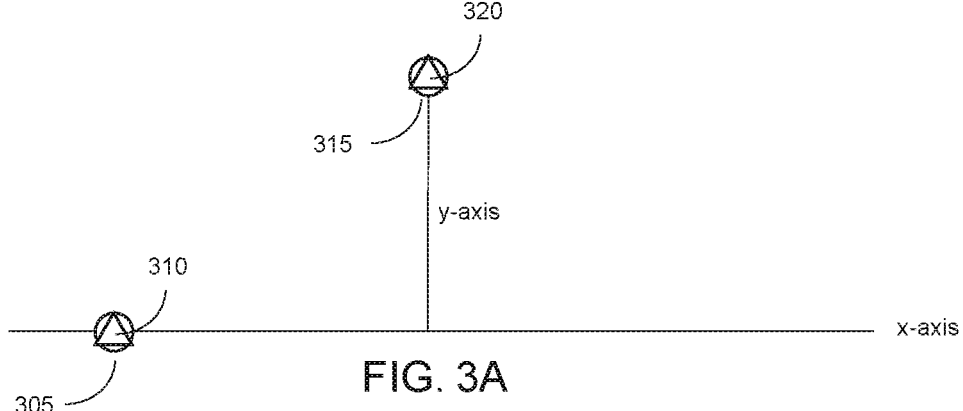
FIGS. 3A and 3B are notional depictions of communication or connection request messages and communication or connection acceptance messages as may be monitored according to embodiments of the invention.

Data regarding communications, connections, sessions, etc., between networked entities, such as between client computing systems, is challenging to correlate. In particular, there is not a good way in general to know which communication or connection receive-accept events correspond to which communication or connection request events. The typical solution to this problem is to try to match the remote or destination network address for the one network entity, such as an Internet Protocol (IP) destination address for the entity, of each type of event to the local or source network address (e.g., IP source address) of the other event. However, network addresses, including IP addresses, serve as poor communication endpoint identification aliases because they are not unique and are frequently reassigned. Another problem is that network address translation very often thwarts network-based, including IP-based, correlation methods. When remote/destination-local/source address correlation fails, there is often no general alternative. The address correlation approach to matching connect request/receive-accept events can also appear to succeed in cases that amount to false positives, for example, due to address reuse and network address translation. Solving this problem, that is, providing highly or accurately correlated connect request/receive-accept events, enables network service provider and data and network security services such as cybersecurity services and information technology support services, and the professionals providing these services to more quickly and accurately detect troublesome or malicious connections or communications between network entities.

Described herein are systems and methods associated with systems, such as digital security systems, that can identify communication between two networked entities or devices without regard to corresponding local (source) and remote (destination) network addresses respectively assigned to the networked entities. In particular, a first network device can be determined as being in communication or connected in communication with a second network device according to the following process. A first communication request message is received from a first network device that specifies an identifier for the second network device (e.g., one or more of a network address or a unique label) and a first timestamp for the first communication request message. A first communication acceptance message is received from the second network device that specifies an identifier for the first network device (e.g., one or more of a network address or a unique label) and a second timestamp for the first communication acceptance message. Further, a second communication request message is received from the first network device that specifies the identifier for the second network device and a third timestamp for the second communication request message. A second communication acceptance message is received from the second network device that specifies the identifier for the first network device and a fourth timestamp for the second communication acceptance message. The first network device is determined to be in communication with the second network device when the first timestamp and the second timestamp indicate the first communication request message and the first communication acceptance message occurred at substantially the same time and when the third timestamp and the fourth timestamp indicate the second communication request message and the second communication acceptance message occurred at substantially the same time. Further details are described below with reference to FIGS. 1-4.

It is contemplated that embodiments of the invention may be carried out by a digital security system that can observe events that occur on multiple computing devices, including the events described below, and can use event data about one or more event occurrences to detect and/or analyze or infer security threats. It is further contemplated that the digital security system can receive event data reported by local security agents or sensors executing on the computing devices and store the event data associated with such computing devices at a cloud server or other centralized repository.

A computing device may have at least one sensor that is configured to detect the occurrence of events on the computing device. For example, the sensor may be a security agent installed on the computing device that is configured to monitor operations of the computing device, such as operations executed by an operating system and/or applications, operations that involve connecting over a network to another computing device (whether, for example, a client computing device or a server or web computing device). The sensor may be configured to detect when certain types of events occur on the computing device. The sensor may also be configured to transmit an event stream including such events over the Internet and/or other data networks to the digital security system that implements embodiments of the invention.

The event stream may indicate information about multiple events on the computing device that were detected by the sensor. Such events can include events and behaviors associated with software operations on the computing device, such as events associated with network connection request messages, network connection acceptance messages, Internet Protocol (IP) network connections, other network connections, Domain Name System (DNS) requests and responses, operating system functions, file operations, registry changes, process executions, and/or any other type of operation. By way of non-limiting examples, an event may be that a process opened a file, initiated a DNS request, or opened an outbound connection to a certain IP address, or that there was an inbound IP connection, that values in an operating system registry were changed, or any other type of event. In some examples, events may also, or alternatively, be associated with hardware events or behaviors, such as virtual or physical hardware configuration changes or other hardware-based operations. By way of non-limiting examples, an event may be that a Universal Serial Bus (USB) memory stick or other USB device was inserted or removed, that a network cable was plugged in or unplugged, that a cabinet door or other component of the computing device was opened or closed, or any other physical or hardware-related event.

The digital security system may be part of a distributed digital security system, such as a system associated with a security service that operates remotely from the computing device. For example, the digital security system can be, or execute on, a computing system different from the client computing device, such as the computing system described below with respect to FIG. 4. In some examples, the digital security system may process event streams associated with multiple computing devices. An event graph may be generated from such event streams. The event graph may be associated with a single computing device or a group of computing devices. One or more processors in the digital security system can use queries to determine when events or patterns of events, associated with one or more behaviors of interest, have occurred on one or more of the computing devices. In some examples, a behavior of interest associated with a query may be malicious behavior, such as behavior that may occur when malware is executing on the computing device, when the computing device is under attack by an adversary who is attempting to access or modify data on the computing device without authorization, or when the computing device is subject to any other security threat.

With reference to flowchart 100 in FIG. 1, embodiments of the invention can identify, report, declare with confidence or otherwise provide output indicating that a first networked computing device (hereinafter "the first network device") is or was in communication or connected in communication with a second networked computing device (hereinafter "the second network device"), according to the following process or series of method steps. At step 105, the digital security system receives event data from the network that includes, for example, information about the first network device and the second network device. Based on that event data, the digital security system detects in the event data a first communication or connection request message (hereinafter "the first communication request message") from the first network device specifying an identifier (e.g., a destination IP address or other destination network address) for the second network device and a first timestamp for the first communication request message. Additionally or alternatively, the identifier for the second network device may be an agent or sensor identifier (AID) of an agent or sensor installed on the second network device, a media access control (MAC) address or other address that provides a unique identifier assigned to a network interface of the second network device for communications on a physical network segment, a hardware address, a canonical address, a name, or any other unique identifier (perhaps globally unique identifier) of or for the second network device. In some examples, a communication request message as described herein includes both a destination network address and an additional identifier, such as an AID.

At step 110, the digital security system detects, based on the event data, a first communication or connection acceptance message (hereinafter "the first communication acceptance message") from the second network device specifying an identifier for the first network device and a second timestamp for the first communication acceptance message. The identifier for the first network device may be a destination network address (e.g., IP address), an agent or sensor identifier (AID) of an agent or sensor installed on the first network device, a media access control (MAC) address or other address that provides a unique identifier assigned to a network interface of the first network device for communications on a physical network segment, a hardware address, a canonical address, a name, or any other unique identifier of or for the first network device.

In the same manner as described above in connection with step 105, but at a subsequent point in time, the digital security system detects, based on the event data, at step 115, a second communication or connection request message (hereinafter "the second communication request message") from the first network device specifying the identifier for the second network device and a third timestamp for the second communication request message. Similarly, at step 120, the digital security system detects, based on the event data, a second communication or connection acceptance message ("second communication acceptance message") received from the second network device, specifying the identifier for the first network device and a fourth timestamp for the second communication acceptance message.

At step 125, the digital security system declares or otherwise provides output indicating the first network device is or was in communication with the second network device based on the first timestamp for the first communication request message and the second timestamp for the first communication acceptance message indicating the first communication request message and the first communication acceptance message occurred at a substantially same time (e.g., within a fixed time interval or a dynamic time interval of each other, either of which time periods may be based on network characteristics or environment), and the third timestamp for the second communication request message and the fourth timestamp for the second communication acceptance message indicating the second communication request message and the second communication acceptance message occurred at a substantially same time.

It is appreciated that in general there is a small amount of delay that occurs between dependent communications exchanged between two computing devices over a network, owing to the time it takes for a first communication from the first computing device to be transmitted over the network to the second computing device, plus the time it takes for the second computing device to process the first communication once received and prepare a response to be transmitted in a second communication from the second computing device to the first computing device, and plus the time it takes for the second communication from the second computing device to be transmitted over the network to the first computing device. This delay is typically on the order of tens of milliseconds. Thus, the digital security system declares or otherwise provides output indicating the first network device is or was in communication with the second network device when the first timestamp for the first communication request message and the second timestamp for the first communication acceptance message indicate the first communication request message and the first communication acceptance message occurred at substantially the same time, e.g., within the typical round trip delay time expected for the pair of the first communication request message and the first communication acceptance message, and when the third timestamp for the second communication request message and the fourth timestamp for the second communication acceptance message indicate the second communication request message and the second communication acceptance message occurred at a substantially same time, e.g., within the typical round trip delay time expected for the pair of the second communication request message and the second communication acceptance message.

With reference to flowchart 200 in FIG. 2, according to additional embodiments of the invention, the digital security system may also, at step 205, calculate a first time interval between the first communication request message and the second communication request message based on the first timestamp and the third timestamp, and at step 210, calculate a second time interval between the first communication acceptance message and the second communication acceptance message based on the second timestamp and the fourth timestamp. Then, at step 225, in addition to the digital security system declaring that the first network device is or was in communication with the second network device at step 125 when the first timestamp for the first communication request message and the second timestamp for the first communication acceptance message indicate the first communication request message and the first communication acceptance message occurred at a substantially same time, and when the third timestamp for the second communication request message and the fourth timestamp for the second communication acceptance message indicate the second communication request message and the second communication acceptance message occurred at a substantially same time, the digital security system may also take into consideration when declaring the first network device is or was in communication with the second network device that the first time interval between the first connection request and the second connection request is substantially equal to the second time interval between the first communication acceptance message and the second communication acceptance message. Alternatively, the digital security system may declare or otherwise provide output indicating the first network device is or was in communication with the second network device solely based on the first time interval between the first connection request and the second connection request being substantially equal to the second time interval between the first communication acceptance message and the second communication acceptance message.

According to the above-described embodiment, the pair of the first communication request message and the first communication acceptance message are the last such pair of communications exchanged between the first and second network device before the pair of the second communication request message and the second communication acceptance message are exchanged between the first and second network device. In other words, the first communication request message between the first network device and the second network device immediately precedes, and is next followed by, the second of a plurality of communication request messages between the first network device and the second network device, and the first communication acceptance message between the second network device and the first network device immediately precedes, and is next followed by, the second of a plurality of communication acceptance messages between the second network device and the first network device.

Figure 3B:
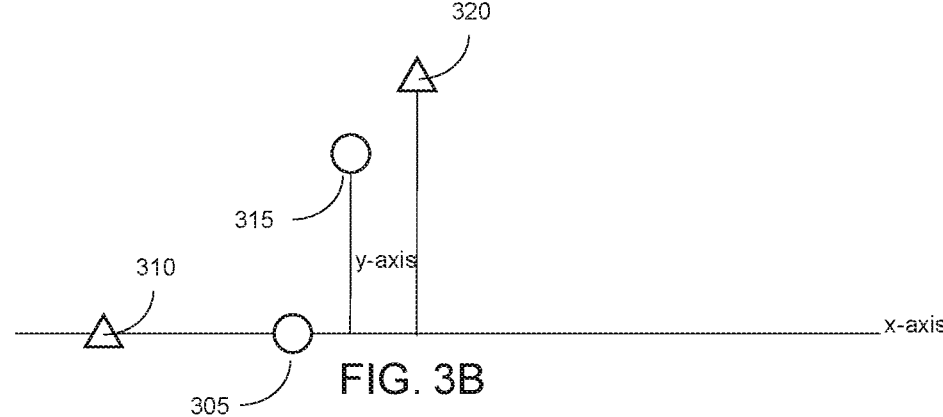

FIG. 3A provides a notional depiction of correlated communication request messages and communication acceptance messages in accordance with embodiments of the invention. (Note the x-axis in FIG. 3A, as well as FIG. 3B, is linearly scaled, but the y-axis is logarithmically scaled so that displaying data on the y-axis over a very wide range of values can be accomplished in a compact way). With reference to FIGS. 1 and 3A, at step 105, the digital security system receives from the first network device a first communication or connection request message 305 depicted by the circle on the x-axis in FIG. 3A (hereinafter "the first communication request message 305") specifying an identifier for the second network device (e.g., a destination IP address of 192.168.1.100), as well as an additional identifier which, in this example, is an agent identifier (AID) of 0x123 for the second network device, and a first timestamp of 12:00 UTC for the first communication request message.

At step 110, the digital security system receives from the second network device a first communication or connection acceptance message 310 depicted by the triangle on the x-axis in FIG. 3A (hereinafter "the first communication acceptance message 310") specifying an identifier for the first network device (e.g., a destination IP address of 10.0.0.1), and an additional identifier, the AID of 0xdef, for the first network device, and a second timestamp of 12:00 UTC for the first communication acceptance message. These two messages are positively correlated in that they occur at the same time; hence the circle at 305 and the triangle at 310 overlap in FIG. 3A.

In the same manner as described above in connection with step 105, but at a subsequent point in time, the digital security system receives at step 115 from the first network device a second communication or connection request message 315 depicted by the circle on the logarithmic-scaled y-axis in FIG. 3A (hereinafter "the second communication request message 315") specifying the identifier for the second network device (e.g., the destination IP address of 192.168.1.100), the additional identifier AID of 0x123 for the second network device, and a third timestamp of 13:00 UTC for the second communication request message. Similarly, at step 120, the digital security system receives from the second network device a second communication or connection acceptance message 320 depicted by the triangle on the y-axis in FIG. 3A ("second communication acceptance message 320") specifying the identifier for the first network device (e.g., a destination IP address of 10.0.0.1), the additional identifier AID of 0xdef for the first network device, and a fourth timestamp of 13:00 UTC for the second communication acceptance message. These two messages are also positively correlated in that they occur at the same time; hence the circle at 315 and the triangle at 320 overlap in FIG. 3A.

Note that the pair of messages 305/310 and 315/320 are highly positively correlated in that each pair specifies the same identifiers, e.g., the same destination IP addresses, and AIDs for the first and second network devices, and the same elapsed time interval occurs between the respective communication request message 305, 315 and communication acceptance message 310, 320 in each pair. This high level of overlap correspondence gives the digital security system very high confidence of a correspondence or correlation between the pairs of communication request and communication acceptance messages. Thus, embodiments of the invention can provide output indicating with a high degree of confidence that the first network device and the second network device are or were in communication or connected with each other. Thus, at step 125, the digital security system indicates the first network device is or was in communication with the second network device when the first timestamp for the first communication request message 305 and the second timestamp for the first communication acceptance message 310 indicate the first communication request message and the first communication acceptance message occurred at a substantially same time, and when the third timestamp for the second communication request message 315 and the fourth timestamp for the second communication acceptance message 320 indicate the second communication request message and the second communication acceptance message occurred at a substantially same time.

In contrast to FIG. 3A which provides a notional depiction of correlated communication request messages and communication acceptance messages in accordance with embodiments of the invention, FIG. 3B provides a notional depiction of uncorrelated communication request messages and communication acceptance messages. With reference to FIG. 3B, the digital security system receives from the first network device a first communication or connection request message 305 depicted by the circle on the x-axis in FIG. 3B (hereinafter "the first communication request message 305") specifying an identifier for the second network device (e.g., a destination IP address of 192.168.1.100), as well as an additional identifier, the agent identifier (AID) of 0x123, for the second network device, and a first timestamp of 12:30 UTC for the first communication request message.

The digital security system also receives from the second network device a first communication or connection acceptance message 310 depicted by the triangle on the x-axis in FIG. 3B (hereinafter "the first communication acceptance message 310") specifying an identifier for the first network device (e.g., a destination IP address of 10.0.0.1), an additional identifier, the AID of 0xdef, for the first network device, and a second timestamp of 12:00 UTC for the first communication acceptance message. These two messages are negatively correlated in that they occur at different times. Indeed, the first communication acceptance message occurs one half hour before the first communication request message; hence the circle at 305 and the triangle at 310 do not overlap as in FIG. 3A.

In the same manner as described above, but at a subsequent point in time, the digital security system receives from the first network device a second communication or connection request message 315 depicted by the circle on the logarithmic-scaled y-axis in FIG. 3B (hereinafter "the second communication request message 315") specifying the identifier for the second network device (e.g., the destination IP address of 192.168.1.100), the additional identifier, the AID of 0x123, for the second network device, and a third timestamp of 12:45 UTC for the second communication request message. The digital security system also receives from the second network device a second communication or connection acceptance message 320 depicted by the triangle on the y-axis in FIG. 3B ("second communication acceptance message 320") specifying the identifier for the first network device (e.g., a destination IP address of 10.0.0.1), the additional identifier, the AID of 0xdef, for the first network device, and a fourth timestamp of 13:00 UTC for the second communication acceptance message. These two messages are also negatively correlated in that they occur at different times; hence the circle at 315 and the triangle at 320 do not overlap in FIG. 3B.

Note that the pair of messages 305/310 and 315/320 are negatively correlated even though each pair specifies the same identifiers, e.g., the same destination IP addresses and AIDs, for the first and second network devices, because the elapsed time interval that occurs between the respective communication request message 305, 315 and communication acceptance message 310, 320 in each pair is different. Thus, embodiments of the invention would not declare or indicate with even a low degree of confidence that the first network device and the second network device are or were in communication or connected with each other.

According to an embodiment, one way for the digital security system to bolster confidence in the declaration in either steps 125 or 225 that the first network device is or was in communication with the second network device is to wait at step 215 for a period of time before declaring, or not, that the first network device is or was in communication with the second network device. This allows the digital security system to wait a short period of time, say on the order of one or a few tenths of seconds or seconds, for any additional communications to be exchanged between the first computing device and the second computing device that would either confirm a communication or connection between the two computing devices or introduce some amount of ambiguity into whether there was indeed a communication or connection between the two computing devices. These communications could be other communication request messages or communication acceptance messages, or other types of communication messages, for example, higher level/upper layer protocol communication messages (e.g., TCP, UDP, RDP, HTTP, HTTPS messages, etc.) between the two computing devices that suggest a communication or connection did or did not, or does or does not, exist between the two computing devices.

According to an embodiment, another way for the digital security system to bolster confidence in the declaration in either steps 125 or 225 that the first network device is or was in communication with the second network device is to also correlate event data (other than the communication request messages and communication acceptance messages) associated with at least one of the first network device and the second network device at step 220 before declaring the first network device is or was in communication with the second network device. For example, embodiments may correlate event data at other layers that can corroborate positive correlations before the declaration, such as using remote ComputerName data from UserLogon events. For example, embodiments may corroborate correlations between communication request/communication accept message pairs based on a further correlation, or not, between a protocol family (e.g., TCP/UDP) and port number (137, 3389, etc.), or just protocol family in the case of protocols that do not use ports for identification of recipients e.g., ICMP and ARP. According to such embodiments, correlation in endpoint ID pairs that are seen across different ports (137, 139, and 445 are well-known examples that would be expected to be observed together, for example) can be used for corroborating correlated communication request/acceptance connections, and thereby increase the confidence of such correlations when combined together, or degrade the confidence of such correlations when contradictions or uncorrelated protocol families, or protocol families and port numbers, are detected.

It is appreciated that a digital security system in accordance with embodiments of the invention may be receiving event data including instances of communication request messages and communication acceptance messages from thousands or tens of thousands of computing devices. Thus, to scale embodiments of the invention, it may be helpful to filter the amount of event data that is received. In particular, it may be helpful to receive from the first network device only the first and second communication request messages that are selected from among a plurality of communication request messages received from the first network device and to receive from the second network device only the first and second communication acceptance messages that are selected from among a plurality of communication acceptance messages received from the second network device. In other words, it may be beneficial to filter highly frequent, repetitive communication request messages and/or communication acceptance messages. This may be accomplished, for example, by receiving and processing only the first occurrences of such repetitive messages, or by periodically sampling and correlating messages only at sampling-determined time intervals. Further, it may be beneficial to filter all but those messages that relate to certain protocols such as UDP, TCP, or to Microsoft's Remote Desktop Protocol (RDP), or only certain service ports, e.g., service port 3389 which relates only to RDP messages.

In addition to, or as an alternative to filtering the amount of event data that is received, one embodiment rate limits the amount of event data that can be stored in the centralized repository, e.g., an ordered log database. According to one embodiment, event data associated with communication request and/or acceptance messages (e.g., a remote IP address, an AID and a timestamp) may be stored, or blocked from being stored, in high dimension data logs, according to a rate-limiting algorithm, such as the rate-limiting algorithm described in U.S. patent application Ser. No. 17/902,628, filed Sep. 2, 2022, titled "Selective Addition of Datum to a Tree Data Structure," the entire contents of which are incorporated herein by reference. In accordance with the rate-limiting algorithm, not all high frequency/repetitive event data is stored in the data logs.

That the correlation between communication request messages and communication acceptance messages can be accomplished, in real time, and at scale, according to the above-described embodiments, provides evidence of the value of the underlying concept of performing network connection correlation, and implicitly, network device or entity resolution, without regard for IP address correlation.

Once it is possible to make these correlations in real time, and at scale, it is then possible to act on this information. For example, the digital security system can graph and/or map (e.g., create a network topology map of) network connections between network devices and the frequency of communications or connections between such devices. New connections, or significant changes in the number and frequency of connections between any one network device and another network device can be readily remediated, such as by being discerned, investigated, or restricted. If malicious activity is suspected, for instance based on having resolved the existence of communication deemed not allowed or deemed anomalous (e.g., based on historical connectivity), the digital security system may take actions to remediate (e.g., mitigate or prevent) any further such activity. For example, the digital security system can push information to one or more network devices involved in the corroborated communications or connections to alert them of a potential problem and/or take action of some kind, such as monitoring, disabling or stopping communications or connections between the one or more network devices and other network devices. Combined with other event data captured from networked devices, it is possible for the digital security device to also identify which protocol and applications are being used in the connections and communications between or executing on the networked devices and transmit alerts, recommended actions or instructions to take (e.g., monitor protocol and/or application activity) to one or more network devices to improve, for example, network performance, computing performance, and security at or in communications involving the networked devices.

Figure 4:
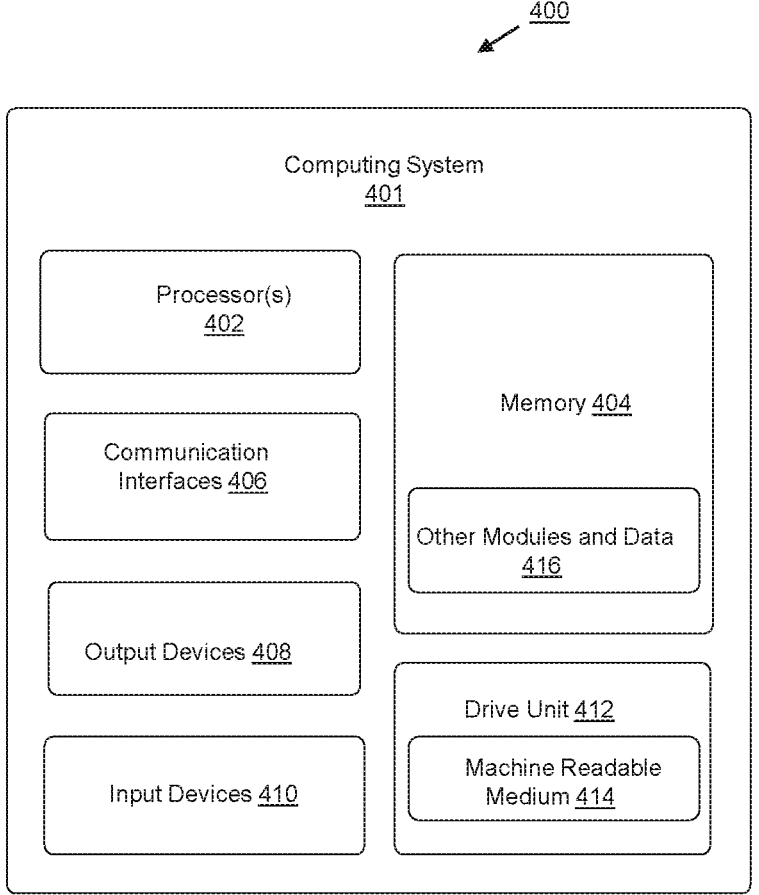
FIG. 4 shows an example system architecture for a computing system that may be used in accordance with embodiments of the invention.

FIG. 4 shows an example system architecture 400 for a computing system 401 capable of carrying out embodiments of the invention described herein. The computing system 401 can be a server, computer, or other type of computing device that executes instructions for carrying out embodiments of the invention. In some examples, the instructions can be executed by a dedicated computing system 401. In other examples, the computing system 401 can execute one or more instructions via virtual machines or other virtualized instances. For instance, the computing system 401 may execute multiple instructions in parallel, using different virtual machines, parallel threads, or other parallelization techniques.

The computing system 401 can include memory 404. In various examples, the memory 404 can include system memory, which may be volatile (such as RAM), non-volatile (such as ROM, flash memory, non-volatile memory express (NVMe), etc.) or some combination of the two. The memory 404 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing system 401. Any such non-transitory computer-readable media may be part of the computing system 401.

The memory 404 can store data associated embodiments of the invention, such a connection requests, connection acceptances, network addresses, machine identifiers, etc. The data may be stored locally in the memory 404 such that the computing system 401 can locally interact with the data. The memory 404 can also store other modules and data 416. The modules and data 416 can include any other modules and/or data that can be utilized by the computing system 401 to perform or enable performing the actions described herein. Such other modules and data can include a platform, operating system, and applications, and data utilized by the platform, operating system, and applications.

By way of a non-limiting example, the computing system 401 that executes the instructions for carrying out embodiments of the invention may have non-volatile memory, such as an NVMe disk configured to store data and instructions. The computing system 401 that executes the instructions may also have volatile memory, such as synchronous dynamic RAM (SDRAM), double data rate (DDR) SDRAM, DDR2 SDRAM, DDR3 SDRAM, or DD4 SDRAM.

The computing system 401 can also have one or more processors 402. In various examples, each of the processors 402 can be a central processing unit (CPU), a graphics processing unit (GPU), both a CPU and a GPU, or any other type of processing unit. For example, the processors 402 may be a 10-core CPU, or any other type of processor. Each of the one or more processors 402 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processors 402 may also be responsible for executing computer applications stored in the memory 404, which can be associated with types of volatile and/or non-volatile memory.

The computing system 401 can also have one or more communication interfaces 406. The communication interfaces 406 can include transceivers, modems, interfaces, antennas, telephone connections, and/or other components that can transmit and/or receive data over networks, telephone lines, or other connections. For example, the communication interfaces 406 can include one or more network cards that can be used to receive the event data and/or output results.

In some examples, the computing system 401 can also have one or more input devices 410, such as a keyboard, a mouse, a touch-sensitive display, voice input device, etc., and/or one or more output devices 408 such as a display, speakers, a printer, etc. These devices are well known in the art and need not be discussed at length here.

The computing system 401 may also include a drive unit 412 including a machine readable medium 414. The machine readable medium 414 can store one or more sets of instructions, such as software or firmware, that embodies any one or more of the methodologies or functions described herein. The instructions can also reside, completely or at least partially, within the memory 404, processor(s) 402, and/or communication interface(s) 406 during execution thereof by the computing system 401. The memory 404 and the processor(s) 402 also can constitute machine readable media 414.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method for a digital security system, the method comprising:

receiving event data associated with a network, comprising a plurality of communication request messages and a plurality of communication acceptance messages received from a plurality of network devices;

selecting from the event data a first communication request message from a first network device specifying an identifier for a second network device and a first timestamp for the first communication request message;

selecting from the event data a first communication acceptance message from the second network device specifying an identifier for the first network device and a second timestamp for the first communication acceptance message;

selecting from the event data a second communication request message from the first network device specifying the identifier for the second network device and a third timestamp for the second communication request message;

selecting from the event data a second communication acceptance message from the second network device specifying the identifier for the first network device and a fourth timestamp for the second communication acceptance message; and generating an indication that the first network device communicated with the second network device based on the first timestamp for the first communication request message and the second timestamp for the first communication acceptance message indicating the first communication request message and the first communication acceptance message occurred within a selected time interval, and based on the third timestamp for the second communication request message and the fourth timestamp for the second communication acceptance message indicating the second communication request message and the second communication acceptance message occurred within the selected time interval.

2. The computer-implemented method of claim 1 further comprising the digital security system:

calculating a first time interval between the first communication request message and the second communication request message based on the first timestamp and the third timestamp;

calculating a second time interval between the first communication acceptance message and the second communication acceptance message based on the second timestamp and the fourth timestamp; and wherein generating the indication that the first network device communicated with the second network device further comprises generating an indication that the first network device communicated with the second network device based on the first time interval between the first connection request and the second connection request being substantially equal to the second time interval between the first communication acceptance message and the second communication acceptance message.

3. The computer-implemented method of claim 1, wherein the first communication request message between the first network device and the second network device is next followed by the second of the plurality of communication request messages between the first network device and the second network device, and the first communication acceptance message between the second network device and the first network device is next followed by the second of the plurality of communication acceptance messages between the second network device and the first network device.

4. The computer-implemented method of claim 1, further comprising the digital security system waiting a period of time before generating the indication that the first network device communicated with the second network device based on the first timestamp for the first communication request message and the second timestamp for the first communication acceptance message indicating the first communication request message and the first communication acceptance message occurred within the selected time interval, and based on the third timestamp for the second communication request message and the fourth timestamp for the second communication acceptance message indicating the second communication request message and the second communication acceptance message occurred within the selected time interval.

5. The computer-implemented method of claim 1 further comprising the digital security system correlating event data associated with at least one of the first network device and the second network device before generating the indication that the first network device communicated with the second network device based on the first timestamp for the first communication request message and the second timestamp for the first communication acceptance message indicating the first communication request message and the first communication acceptance message occurred within the selected time interval, and based on the third timestamp for the second communication request message and the fourth timestamp for the second communication acceptance message indicating the second communication request message and the second communication acceptance message occurred within the selected time interval.

6. The computer-implemented method of claim 1, wherein selecting the first and second communication request messages and the first and second communication acceptance messages from the event data comprises selecting the first and second communication request messages and the first and second communication acceptance messages at pre-determined sampling intervals from the event data.

7. The method of claim 1, further comprising the digital security system remediating an anomalous connection based on determining that the first timestamp for the first communication request message and the second timestamp for the first communication acceptance message indicate the first communication request message and the first communication acceptance message occurred within the selected time interval, and further that the third timestamp for the second communication request message and the fourth timestamp for the second communication acceptance message indicate the second communication request message and the second communication acceptance message occurred within the selected time interval.

8. Non-transitory computer-readable media storing computer-executable instructions that, when executed by one or more processors, cause the one or more processors to perform operations comprising:

receiving event data comprising a plurality of communication request messages and a plurality of communication acceptance messages received from a plurality of network devices;

selecting from the event data a first communication request message from a first network device specifying an identifier for a second network device and a first timestamp for the first communication request message;

selecting from the event data a first communication acceptance message from the second network device specifying an identifier for the first network device and a second timestamp for the first communication acceptance message;

selecting from the event data a second communication request message from the first network device specifying the identifier for the second network device and a third timestamp for the second communication request message;

selecting from the event data a second communication acceptance message from the second network device specifying the identifier for the first network device and a fourth timestamp for the second communication acceptance message; and generating an indication that the first network device communicated with the second network device based on the first timestamp for the first communication request message and the second timestamp for the first communication acceptance message indicating the first communication request message and the first communication acceptance message occurred within a selected time interval, and further based on the third timestamp for the second communication request message and the fourth timestamp for the second communication acceptance message indicating the second communication request message and the second communication acceptance message occurred within the selected time interval.

9. The non-transitory computer-readable media of claim 8, wherein the instructions to cause the one or more processors to perform further operations comprising:

calculating a first time interval between the first communication request message and the second communication request message based on the first timestamp and the third timestamp;

calculating a second time interval between the first communication acceptance message and the second communication acceptance message based on the second timestamp and the fourth timestamp; and wherein generating the indication that the first network device communicated with the second network device further comprises generating an indication that the first network device communicated with the second network device based on the first time interval between the first connection request and the second connection request being substantially equal to the second time interval between the first communication acceptance message and the second communication acceptance message.

10. The non-transitory computer-readable media of claim 8, wherein the first communication request message between the first network device and the second network device is next followed by the second of the plurality of communication request messages between the first network device and the second network device, and the first communication acceptance message between the second network device and the first network device is next followed by the second of the plurality of communication acceptance messages between the second network device and the first network device.

11. The non-transitory computer-readable media of claim 8, wherein the instructions to cause the one or more processors to perform further operations comprising waiting a period of time before generating the indication that the first network device communicated with the second network device based on the first timestamp for the first communication request message and the second timestamp for the first communication acceptance message indicating the first communication request message and the first communication acceptance message occurred within the selected time interval, and based the third timestamp for the second communication request message and the fourth timestamp for the second communication acceptance message indicating the second communication request message and the second communication acceptance message occurred within the selected time interval.

12. The non-transitory computer-readable media of claim 8 wherein the instructions to cause the one or more processors to perform further operations comprising correlating event data associated with at least one of the first network device and the second network device before generating the indication that the first network device communicated with the second network device based on the first timestamp for the first communication request message and the second timestamp for the first communication acceptance message indicating the first communication request message and the first communication acceptance message occurred within the selected time interval, and based on the third timestamp for the second communication request message and the fourth timestamp for the second communication acceptance message indicating the second communication request message and the second communication acceptance message occurred within the selected time interval.

13. The non-transitory computer-readable media of claim 8, wherein selecting the first and second communication request messages and the first and second communication acceptance messages from the event data comprises selecting the first and second communication request messages and the first and second communication acceptance messages at pre-determined sampling intervals from the event data.

14. A system comprising:
a memory to store instructions;
a processor to execute the instructions stored in the memory;
wherein the system is configured to provide output indicating that a first network device is or was in communication with a second network device, by executing the instructions via the processor for:
receiving event comprising a plurality of communication request messages and a plurality of communication acceptance messages received from a plurality of network devices;
selecting from the event data a first communication request message from a first network device specifying a destination network address for a second network device, an identifier for the second network device, and a first timestamp for the first communication request message;
selecting from the event data a first communication acceptance message from the second network device specifying a destination network address for the first network device, an identifier for the first network device, and a second timestamp for the first communication acceptance message;
selecting from the event data a second communication request message from the first network device specifying the destination network address for the second network device, the identifier for the second network device, and a third timestamp for the second communication request message;

selecting from the event data a second communication acceptance message from the second network device specifying the destination network address for the first network device, the identifier for the first network device, and a fourth timestamp for the second communication acceptance message; and
providing output indicating the first network device is or was in communication with the second network device when the first timestamp for the first communication request message and the second timestamp for the first communication acceptance message indicate the first communication request message and the first communication acceptance message occurred within a selected time interval, and when the third timestamp for the second communication request message and the fourth timestamp for the second communication acceptance message indicate the second communication request message and the second communication acceptance message occurred within the selected time interval.

15. The system of claim 14, wherein the instructions to cause the one or more processors to perform further operations comprising:
calculating a first time interval between the first communication request message and the second communication request message based on the first timestamp and the third timestamp;
calculating a second time interval between the first communication acceptance message and the second communication acceptance message based on the second timestamp and the fourth timestamp; and
wherein providing output indicating the first network device is or was in communication with the second network device further comprises providing output indicating the first network device is or was in communication with the second network device when the first time interval between the first connection request and the second connection request is substantially equal to the second time interval between the first communication acceptance message and the second communication acceptance message.

16. The system of claim 14, wherein the first communication request message between the first network device and the second network device is next followed by the second of the plurality of communication request messages between the first network device and the second network device, and the first communication acceptance message between the second network device and the first network device is next followed by the second of the plurality of communication acceptance messages between the second network device and the first network device.

17. The system of claim 14, wherein the instructions to cause the one or more processors to perform further operations comprising waiting a period of time before providing output indicating the first network device is or was in communication with the second network device when the first timestamp for the first communication request message and the second timestamp for the first communication acceptance message indicate the first communication request message and the first communication acceptance message occurred within the selected time interval, and when the third timestamp for the second communication request message and the fourth timestamp for the second communication acceptance message indicate the second communication request message and the second communication acceptance message occurred within the selected time interval.

18. The system of claim 14 wherein the instructions to cause the one or more processors to perform further operations comprising correlating event data associated with at least one of the first network device and the second network device before providing output indicating the first network device is or was in communication with the second network device when the first timestamp for the first communication request message and the second timestamp for the first communication acceptance message indicate the first communication request message and the first communication acceptance message occurred within the selected time interval, and the third timestamp for the second communication request message and the fourth timestamp for the second communication acceptance message indicate the second communication request message and the second communication acceptance message occurred within the selected time interval.

* * * * *